United States Patent
Satake et al.

(10) Patent No.: US 9,885,506 B2
(45) Date of Patent: Feb. 6, 2018

(54) EXPANSION VALVE

(71) Applicant: TGK CO., LTD., Tokyo (JP)

(72) Inventors: Ryosuke Satake, Tokyo (JP); Takeshi Watanabe, Tokyo (JP)

(73) Assignee: TGK CO., LTD., Tokyo (JP)

( * ) Notice: Subject to any disclaimer, the term of this patent is extended or adjusted under 35 U.S.C. 154(b) by 21 days.

(21) Appl. No.: 14/945,376

(22) Filed: Nov. 18, 2015

(65) Prior Publication Data
US 2016/0153689 A1  Jun. 2, 2016

(30) Foreign Application Priority Data

Dec. 2, 2014 (JP) ................................. 2014-243676

(51) Int. Cl.
| | |
|---|---|
| *F25B 41/06* | (2006.01) |
| *F16K 1/14* | (2006.01) |
| *F16K 17/00* | (2006.01) |
| *F16K 27/02* | (2006.01) |
| *F16K 31/00* | (2006.01) |
| *F16K 31/44* | (2006.01) |

(52) U.S. Cl.
CPC .............. *F25B 41/062* (2013.01); *F16K 1/14* (2013.01); *F16K 17/003* (2013.01); *F16K 27/0245* (2013.01); *F16K 31/002* (2013.01); *F16K 31/44* (2013.01); *F25B 2341/06* (2013.01); *F25B 2341/068* (2013.01); *F25B 2341/0683* (2013.01)

(58) Field of Classification Search
CPC ............ F25B 2341/06; F25B 2341/068; F25B 2341/0683; F16K 41/02
USPC ........................................ 251/214, 339, 368
See application file for complete search history.

(56) References Cited

U.S. PATENT DOCUMENTS 3,162,453 A * 12/1964 Magos ................... F16J 15/184
251/214
4,486,002 A * 12/1984 Riess ....................... F16J 15/20
251/214
(Continued)

FOREIGN PATENT DOCUMENTS

| JP | 09-042510 A | 2/1997 | ............. F16K 31/04 |
| JP | 10220925 A | 8/1998 | ............. F25B 41/06 |

(Continued)

OTHER PUBLICATIONS

EP15196377, European Search Report, dated Apr. 25, 2016, Munich.

(Continued)

*Primary Examiner* — Kevin Murphy
(74) *Attorney, Agent, or Firm* — Martine Penilla Group, LLP

(57) ABSTRACT

An expansion valve according to one embodiment includes a body having a valve hole, a valve element which opens and closes a valve section by moving toward and away from the valve hole, and a shaft one end side of which connects to a drive section and the other end side of which connects to the valve element through the valve hole, the shaft transmitting the drive force, generated by the drive section, to the valve element. Here, the shaft is so provided as to run through an insertion hole formed axially with the valve hole in the body. The insertion hole is formed in the body by a cutting work, and has a support that supports the shaft and a diameter-enlarged part that is open to a downstream side of the valve hole and whose diameter is larger than that of the support.

10 Claims, 3 Drawing Sheets

(56) References Cited

U.S. PATENT DOCUMENTS

| 5,078,175 | A | * | 1/1992 | Martin | F16J 9/00 137/242 |
|---|---|---|---|---|---|
| 5,454,547 | A | * | 10/1995 | Brown | F16J 15/18 251/214 |
| 5,732,731 | A | * | 3/1998 | Wafer | F16K 41/023 137/312 |
| 2006/0196201 | A1 | * | 9/2006 | Sendo | B22D 17/007 62/222 |
| 2007/0209387 | A1 | * | 9/2007 | Hirota | F25B 41/062 62/527 |
| 2013/0283836 | A1 | * | 10/2013 | Satake | F25B 41/062 62/225 |

FOREIGN PATENT DOCUMENTS

| JP | 2 667 118 A2 | 11/2003 | F25B 41/06 |
|---|---|---|---|
| JP | 2006266663 A | 10/2006 | F25B 41/06 |
| JP | 2011-133157 A | 7/2011 | F25B 41/06 |
| JP | 2013-242129 | 5/2013 | F25B 41/06 |

OTHER PUBLICATIONS

Korean Patent Office, App. No. 10-2015-0008481, dated Jan. 19, 2015, Dispatch No. 9-5-2015-078306668, Office Action, English Translation.

* cited by examiner

EXPANSION VALVE

CLAIM OF PRIORITY

This application claims priority to Japanese Patent Application No. 2014-243676, filed on Dec. 2, 2014, of which is incorporated herein by reference.

BACKGROUND OF THE INVENTION

1. Field of the Invention

The present invention relates to an expansion valve and, more particularly to an expansion valve suitable for a refrigeration cycle.

2. Description of the Related Art

A refrigeration cycle in an automotive air conditioner is generally configured such that the refrigeration cycle includes a compressor, a condenser, an expansion valve, and an evaporator. The compressor compresses a circulating refrigerant. The condenser condenses the compressed refrigerant. The expansion valve throttles and expands the condensed liquid refrigerant and delivers it by turning it into a spray. Then the evaporator evaporates the misty refrigerant and thereby cools the air inside a vehicle's passenger compartment by the evaporative latent heat. Used as the expansion valve is a thermostatic expansion valve that senses the temperature and pressure of refrigerant at an outlet side of the evaporator such that, for example, the refrigerant led out from the evaporator has a predetermined degree of superheat and that controls the flow rate of refrigerant delivered to the evaporator by opening and closing a valve section.

Such an expansion valve includes a body formed with a first passage for passing the refrigerant flowing from the condenser to the evaporator and a second passage for passing the refrigerant returned from the evaporator and then supplying the refrigerant to the compressor. A valve hole is formed in the first passage, and a valve element is so provided as to face the valve hole. The valve element, which moves toward and away from the valve hole, regulates the flow rate of refrigerant flowing toward the evaporator. Also, provided at one end of the body is a power element that senses the temperature and pressure of refrigerant flowing through the second passage so as to be activated. The drive force of the power element is transmitted to the valve element by way of an elongated shaft. The shaft passes through an insertion hole formed in a partition wall, which divides between the first passage and the second passage, is slidably supported by the insertion hole. One end side of the shaft is connected to the power element, whereas the other end thereof is connected to the valve element by passing through the valve hole (see Reference (1) in the following Related Art List, for instance).

RELATED ART LIST (1) Japanese Unexamined Patent Application Publication No. 2013-242129.

In such an expansion valve, the first passage, the second passage, the valve hole, the insertion hole and so forth are obtained in a manner such that the body is subjected to a cutting work using a drilling tool. However, in the formation of the insertion hole, a burr occurs at an open end thereof. The burr may degrade the sliding performance of the shaft. Specifically, the burr at the open end of the insertion hole is removed by the sliding action of the shaft, so that small pieces of the burr may enter a spacing or gap between the shaft and the insertion hole and may therefore be entangled or trapped in the spacing. This may cause a sliding resistance (friction) to the shaft to be excessively large and may possibly lock the actuation of the shaft depending on a situation. When, in particular, there is a pressure difference between the first passage and the second passage and this pressure difference acts in an extending direction of the insertion hole, the action of pulling the small pieces into the insertion hole is produced. As a result, the above-described problem is more likely to occur.

SUMMARY OF THE INVENTION

The present invention has been made in view of the foregoing problems and a purpose of the present invention is to provide an expansion valve capable of keeping the sliding performance of a shaft in a stabilized manner in the event of a burr occurs during a processing of an insertion hole for the shaft.

One embodiment of the present invention relates to an expansion valve, which is provided in a refrigeration cycle and which throttles and expands refrigerant, having flowed in via a heat exchanger, by allowing the refrigerant to pass through a valve section so as to supply the refrigerant to an evaporator. The expansion valve includes: a metallic body having a lead-in port through which the refrigerant is led in, a lead-out port through which the refrigerant is led out, a valve hole formed in a refrigerant passage joining the lead-in port to the lead-out port, and a valve chamber formed upstream of the valve hole in the refrigerant passage; a valve element, provided in the valve chamber, which opens and closes the valve section by moving toward and away from the valve hole; a drive section that generates drive force used to open and close the valve section; and a shaft one end side of which connects to the drive section and another end side of which connects to the valve element through the valve hole, the shaft transmitting the drive force, generated by the drive section in a direction of axis line, to the valve element, wherein the shaft is so provided as to run through an insertion hole formed axially with the valve hole in the body.

The insertion hole is formed in the body by a cutting work, and the insertion hole has: a support that supports the shaft; and a diameter-enlarged part that is open to a downstream side of the valve hole and whose diameter is larger than that of the support.

By employing this embodiment, an open end of the insertion hole and its vicinity are enlarged in diameter. Thus, should a burr occur in the open end thereof during the forming of the insertion hole, a chance of interference by the burr is low when the shaft is inserted. Accordingly, the burr being drawn or pulled into the spacing between the shaft and insertion hole can be prevented or suppressed. As a result, the sliding performance of the shaft can be kept in a stabilized manner.

DETAILED DESCRIPTION OF THE INVENTION

Figure 1:
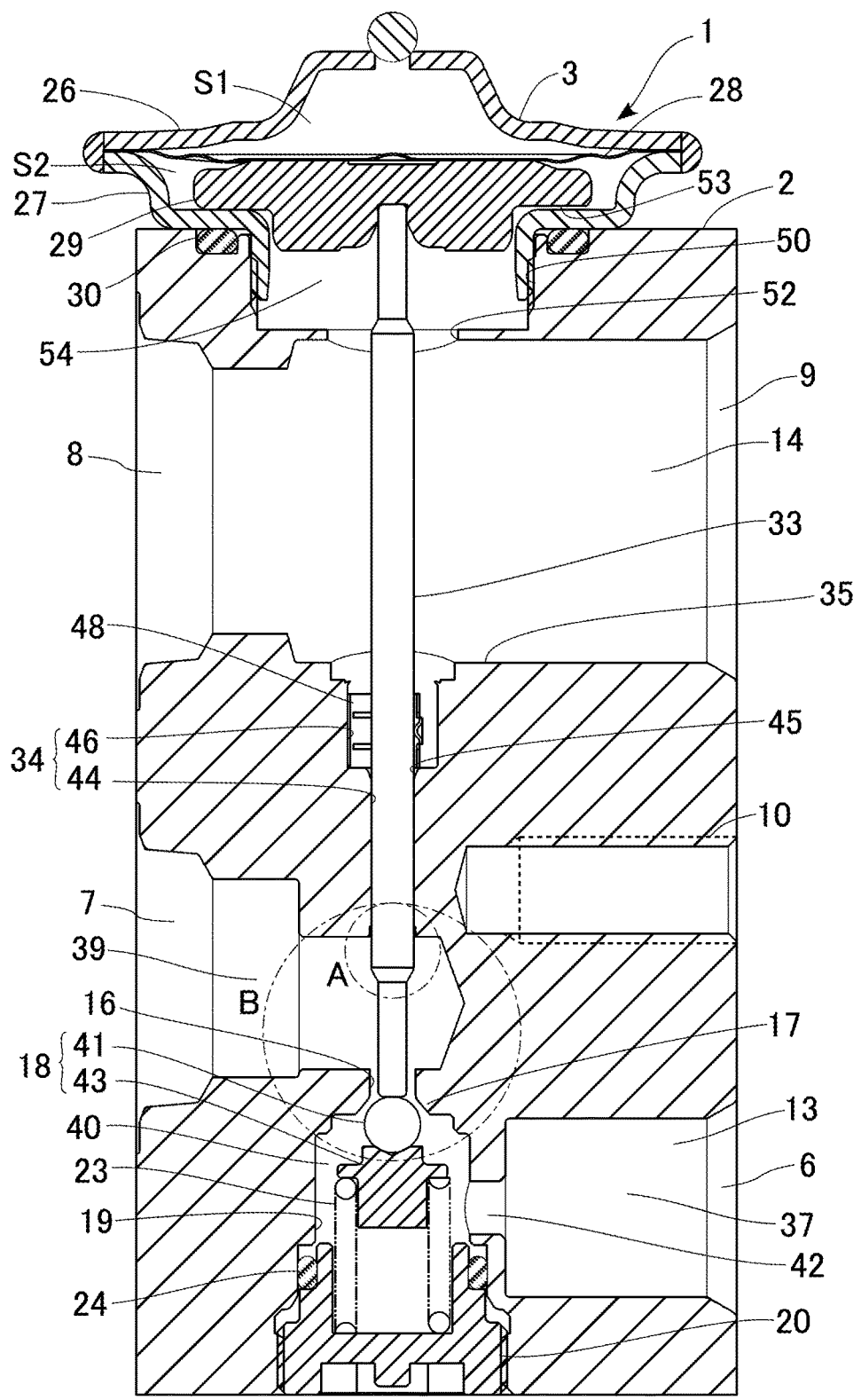
FIG. 1 is a cross-sectional view of an expansion valve according to an embodiment of the present invention.

The invention will now be described by reference to the preferred embodiments. This does not intend to limit the scope of the present invention, but to exemplify the invention.

Embodiments of the present invention will now be described in detail with reference to the accompanying drawings. In the following description, for convenience of description, the positional relationship in each structure may be expressed with reference to how each structure is depicted in Figures. Note that the almost identical components are given the identical reference numerals in the following embodiments and their modifications and that the repeated description thereof will be omitted as appropriate.

The present embodiment is a constructive reduction to practice of the present invention where an expansion valve according to the preferred embodiments is used as a thermostatic expansion valve applied to a refrigeration cycle of an automotive air conditioner. The refrigeration cycle in the automotive air conditioner is configured by including a compressor, a condenser, a receiver, an expansion valve, and an evaporator. Here, the compressor compresses a circulating refrigerant. The condenser condenses the compressed refrigerant. The receiver separates the condensed refrigerant into a gas and a liquid. The expansion valve throttles and expands the separated liquid refrigerant and delivers it by turning it into a spray. The evaporator evaporates the misty refrigerant and thereby cools the air inside a vehicle's passenger compartment by the evaporative latent heat. For convenience, a detailed description of each component except for the expansion valve in this refrigeration cycle is omitted in the following.

FIG. 1 is a cross-sectional view of an expansion valve according to an embodiment. An expansion valve 1 has a body 2 formed such that a member, which has been formed such that a raw material made of an aluminum alloy undergoes extrusion molding, is subjected to a predetermined cutting work. This body 2, which is prismatic in shape, is provided with a valve section. This valve section, which throttles and expands a refrigerant, is formed inside the body 2. A power element 3, which functions as a "drive section", is provided at a longitudinal end of the body 2.

The body 2 has a lead-in port 6, a lead-out port 7, a lead-in port 8, and a lead-out port 9 on sides thereof. The lead-in port 6 receives a high-temperature and high-pressure liquid refrigerant from a receiver side (condenser side). Through the lead-out port 7, a low-temperature and low-pressure refrigerant, which is throttled and expanded by the expansion valve 1, is supplied to the evaporator. The lead-in port 8 receives the refrigerant evaporated by the evaporator. Through the lead-out port 9, the refrigerant, which has passed through the expansion valve 1, returns to the compressor side. A screw hole 10, through which a not-shown stud bolt used to mount the piping can be studded, is formed between the lead-in port 6 and the lead-out port 9. A piping joint is connected to each port.

In the expansion valve 1, a first passage 13 is configured by the lead-in port 6, the lead-out port 7, and a refrigerant passage connecting these ports. A valve section is provided in a middle part of the first passage 13. The refrigerant introduced from the lead-in port 6 is throttled and expanded through this valve section and then turned into a spray so as to be supplied to the evaporator through the lead-out port 7. Also, a second passage 14 is configured by the lead-in port 8, the lead-out port 9, and a refrigerant passage connecting these ports. The second passage 14 extends straight, and a middle part of the second passage 14 communicates with an inner part of the power element 3. Part of the refrigerant introduced from the lead-port 8 is supplied to the power element 3 where the temperature thereof is sensed. The refrigerant having passed through the second passage 14 is delivered to the compressor through the lead-out port 9.

A valve hole 16 is provided in a middle part of the first passage 13, and a valve seat 17 is formed by an open end edge on a lead-in port 6 side of the valve hole 16. A valve element 18 is so placed as to face the valve seat 17 from a lead-in port 6 side. The valve element 18 is constructed such that a spherical ball valve element 41, which closes and opens the valve section by touching and leaving the valve seat 17, respectively, is joined to a valve element support 43 that supports the ball valve element 41 from below.

In a lower end part of the body 2, a communication hole 19, which communicates inner space and an outer space of the body 2, is formed; a valve chamber 40, which houses the valve element 18, is formed by an upper half of the communication hole 19. The valve chamber 40 communicates to the valve hole 16 and is formed coaxially with the valve hole 16. The valve chamber 40 also communicates to the lead-in port 6 on a lateral side of the vale chamber 40 by way of an upstream-side passage 37. The upstream-side passage 37 has a small hole 42 that is open to the valve chamber 42. The small hole 42 is formed such that the cross section of the first passage 13 is locally narrowed down.

The valve hole 16 communicates with the lead-out port 7 via a downstream-side passage 39. Thus, the upstream-side passage 37, the valve chamber 40, the valve hole 16, and the downstream-side passage 39 constitute the first passage 13. The upstream-side passage 37 and the downstream-side passage 39 are parallel to each other and each extend in a direction perpendicular to the axis line of the valve hole 16. In a modification, the lead-in port 6 or the lead-out port 7 may be positioned so that projections of the upstream-side passage 37 and the downstream-side passage 39 are perpendicular to each other (so that the upstream-side passage 37 and the downstream-side passage 39 are at skew positions with respect to each other).

An adjusting screw 20 is screwed into a lower half of the communication hole 19 so as to seal the communication hole 19 from outside. A spring 23 for biasing the valve element 18 in a valve closing direction is disposed between the valve element 18 (more specifically, the valve element support 43) and the adjusting screw 20. The load of the spring 23 can be adjusted by adjustment of the insertion amount of the adjusting screw 20 into the body 2. An O-ring 24 for preventing leakage of the refrigerant is disposed between the adjusting screw 20 and the body 2.

A recess 50 is formed at an upper end of the body 2, and an opening 52 connecting the inside and the outside of the body 2 is formed at a bottom of the recess 50. The power element 3 has a lower part screwed into the recess 50 and is mounted on the body 2 in such a manner as to seal the opening 52. A space between the recess 50 and the power element 3 constitutes a temperature sensitive chamber 54.

The power element 3 has a diaphragm 28 provided between an upper housing 26 and a lower housing 27 thereof, and a disc 29 disposed on the lower housing 27 side of the diaphragm 28. The upper housing 26 is formed by press-forming a stainless steel material into a lidded shape. The lower housing 27 is formed by press-forming a stainless steel material into a stepped cylindrical shape. The disc 29 is made of aluminum or an aluminum alloy, for example, and has a higher thermal conductivity than the upper and lower housings 26, 27. The diaphragm 28 is made of a metal thin film in the present embodiment, but may alternatively be made of a thin film of a plastic material such as a polyimide film.

The power element 3 is formed in a shape of a container by making the upper housing 26 and the lower housing 27 in contact with each other at the openings thereof, mounting the diaphragm 28 so that an outer edge of the diaphragm is placed between outer edges of the upper housing 26 and the lower housing 27, and welding along a circumferential joint of the upper and lower housings 26, 27. The inside of the power element 3 is partitioned into a closed space S1 and an open space S2 by the diaphragm 28. A gas for sensing temperature is sealed in the closed space S1. The open space S2 communicates with the second passage 14 via the opening 52. An O-ring 30 for preventing leakage of the refrigerant is disposed between the power element 3 and the body 2. The pressure and the temperature of the refrigerant passing through the second passage 14 are transmitted to a lower surface of the diaphragm 28 through the opening 52 and a groove 53 formed on the disc 29. The temperature of the refrigerant is transmitted to the diaphragm 28 mainly by the disc 29 having a high thermal conductivity.

An insertion hole 34 is formed through a partition wall 35 between the first passage 13 and the second passage 14 at a middle part of the body 2. The insertion hole 34 is a stepped hole having a small-diameter part 44 and a large-diameter part 46. An elongated shaft 33 is slidably inserted in the small-diameter part 44. The shaft 33 is a metal (stainless steel, for example) rod disposed between the disc 29 and the valve element 18. This structure enables drive force resulting from displacement of the diaphragm 28 to be transmitted to the valve element 18 via the disc 29 and the shaft 33, so as to open and close the valve section.

An upper half of the shaft 33 extends across the second passage 14, and a lower half thereof is slidably supported in the small-diameter part 44 of the insertion hole 34. The large-diameter part 46 (which functions as a "mounting hole") contains a vibration-proof spring 48 for applying biasing force in a direction perpendicular to the direction of axis line of the shaft 33, that is, a lateral load (sliding load) onto the shaft 33. The shaft 33 is subjected to the lateral load of the vibration-proof spring 48, which suppresses vibration of the shaft 33 and the valve element 18 caused by refrigerant pressure fluctuation. Since a structure disclosed in Japanese Unexamined Patent Application Publication No. 2013-242129 can be used for the vibration-proof spring 48, detailed description of a specific structure thereof will be omitted.

In the present embodiment, although no sealing member such as an O-ring is provided between the insertion hole 34 and the shaft 33, leakage of refrigerant from the first passage 13 to the second passage 14 is prevented or minimized since the clearance between the shaft 33 and the small-diameter part 44 is sufficiently small. Thus, a so-called clearance seal is achieved. The clearance seal, however, does not completely block a refrigerant flow, and thus permits leakage of refrigerant particularly when there is a pressure difference between the first passage 13 and the second passage 14.

In the expansion valve 1 having the structure as described above, the power element 3 senses the pressure and the temperature of refrigerant having returned from the evaporator via the lead-in port 8, and the diaphragm 28 is displaced. This displacement of the diaphragm 28 results in the drive force, which is transmitted to the valve element 18 via the disc 29 and the shaft 33 so as to open and close the valve section. In the meantime, liquid refrigerant supplied from a receiver is introduced through the lead-in port 6, and throttled and expanded while passing through the valve section, to be turned into a low-temperature and low-pressure spray of refrigerant. The refrigerant is delivered through the lead-out port 7 toward the evaporator.

Next, structures and advantageous effects of main parts of the shaft 33 and the insertion hole 34 will be described.

Figure 2A:
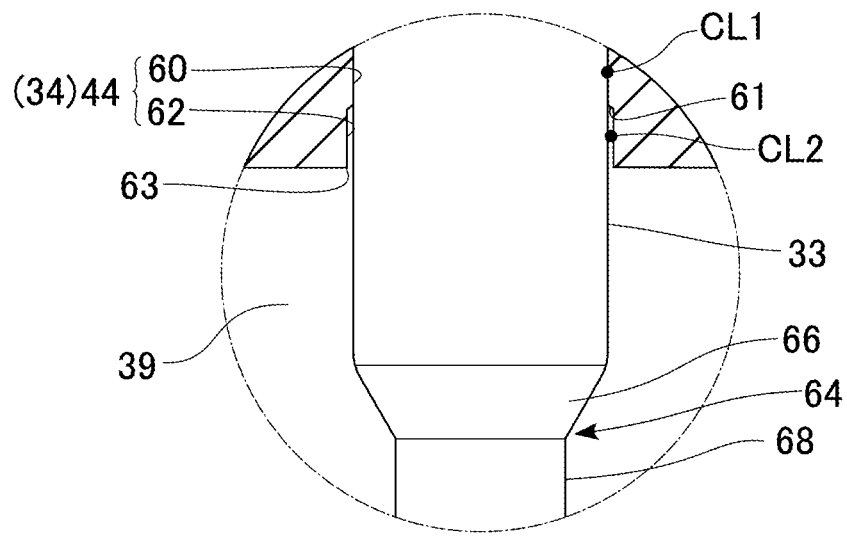
FIGS. 2A and 2B show structures of a shaft, an insertion hole, and their surroundings.
Figure 2B:
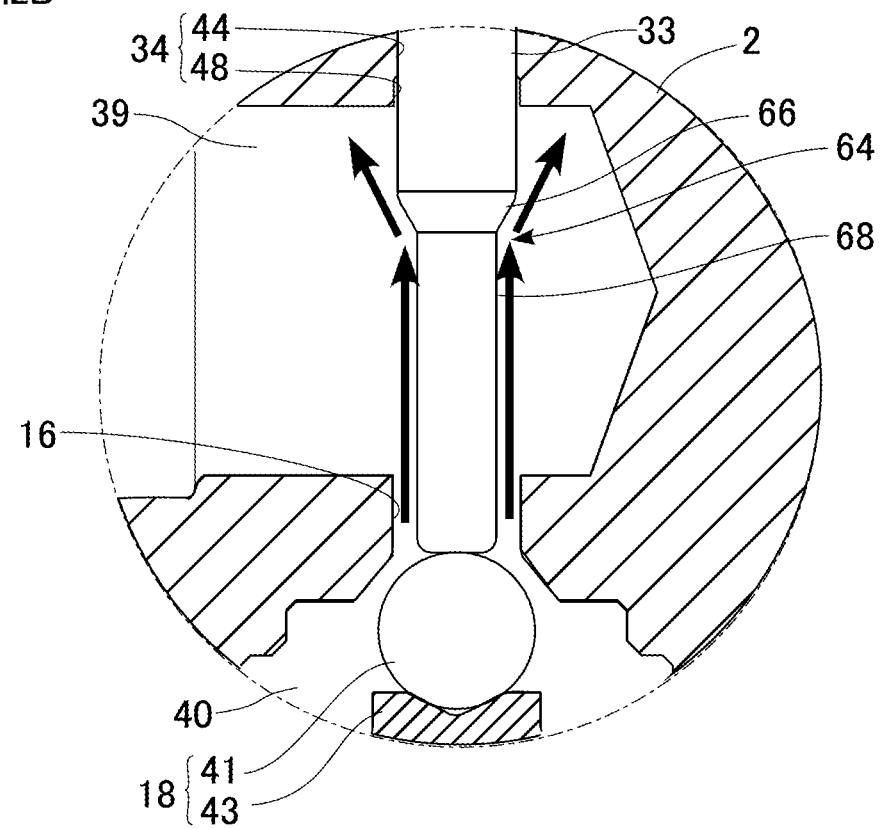

FIGS. 2A and 2B show the structures of the shaft 33, the insertion hole 34 and their surroundings. FIG. 2A is an enlarged view of a part A in FIG. 1. FIG. 2B is an enlarged view of a part B in FIG. 1.

As illustrated in FIG. 2A, the small-diameter part 44 of the insertion hole 34 has a support 60 that supports the shaft 33, and a diameter-enlarged part 62 that is open toward the downstream-side passage 39. The diameter of the diameter-enlarged part 62 is set to a diameter slightly larger than that of the support 60 but not larger than that of the valve hole 16. A boundary between the support 60 and the diameter-enlarged part 62 is chamfered (C-chamfered) to form a tapered boundary surface 61. An open end 63 of the diameter-enlarged part 62 is not chamfered but has an edge shape. Although a taper angle of the chamfering is set to be 45 degrees with respect to an axis line of the insertion hole 34 in the present embodiment, a taper angle of a different value may alternatively be employed. Furthermore, although the chamfering is C-chamfering in the present embodiment, the chamfering may alternatively be R-chamfering (round chamfering).

With such a structure, a clearance CL1 between the support 60 and the shaft 33 are made small, which ensures the clearance seal function, and a clearance CL2 between the diameter-enlarged part 62 and the shaft 33 is made larger than the clearance CL1. As a result, even if a burr is caused at the open end 63 of the diameter-enlarged part 62 in the formation of the insertion hole 34, the burr is less likely to interfere with the shaft 33 and is less likely to be trapped or stuck between the insertion hole 34 and the shaft 33.

In addition, as also illustrated in FIG. 2B, the shaft 33 has a stepped portion 64 having a gradually reduced diameter in the downstream-side passage 39. The stepped portion 64 has a tapered opposed surface 66 facing the valve hole 16. A small-diameter portion 68 on an end side of the stepped portion 64 extends through the valve hole 16 and is connected with the valve element 18. The ball valve element 41 is in contact with the end of the shaft 33.

With the structure as described above, liquid refrigerant introduced from the upstream side when the valve is opened is turned into a spray of gas-liquid two-phase refrigerant through a spacing (orifice passage) between the valve hole 16 and the small-diameter portion 68 and is delivered to the downstream-side passage 39 as indicated by thick arrows in FIG. 2B. In this process, the refrigerant at least partly flows along the small-diameter portion 68 but is made to change its flowing direction by the opposed surface 66. Thus, the refrigerant is less likely to flow toward the insertion hole 34.

Figure 3A:
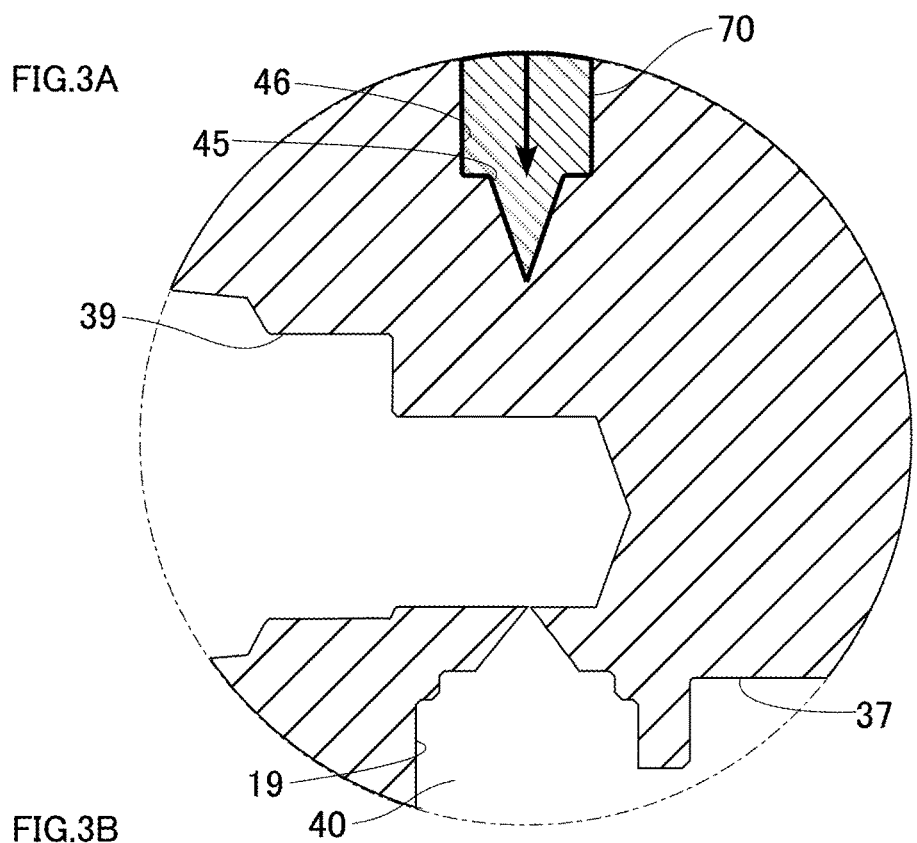
FIGS. 3A and 3B each show a main part of a processing method of an insertion hole.
Figure 3B:
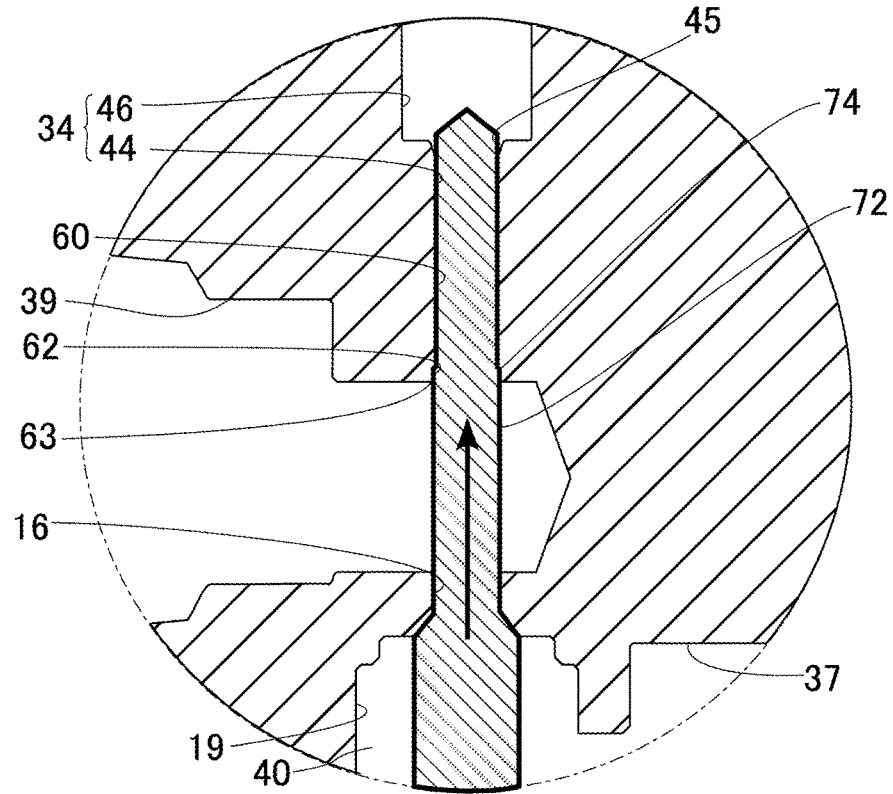

FIGS. 3A and 3B show main parts of a method for processing the insertion hole 34. FIGS. 3A and 3B show processing stages thereof. Prior to the formation of the insertion hole 34, the body 2 is subjected to cutting with a not-shown drill (drilling tool) so that the upstream-side passage 37, the downstream-side passage 39, the communication hole 19 (the valve chamber 40), and the second passage 14 are formed therein.

Subsequently, as illustrated in FIG. 3A, drilling with a drill 70 (drilling tool) is applied from above the body 2 to form the large-diameter part 46. The center of a tip end of the drill 70 has a pointed shape so as to form a tapered surface 45 (see FIG. 1) at the boundary between the large-diameter part 46 and the small-diameter part 44.

Subsequently, as illustrated in FIG. 3B, drilling with a drill 72 (drilling tool) is applied from below the body 2 to form the entire insertion hole 34. A cutting blade of the drill 72 has a stepped portion 74 for forming the diameter-enlarged part 62. In this process, since the stepped portion 74 also has a cutting function for forming the boundary surface 61 as described above, no burr will remain at the lower end opening of the support 60. A burr, however, may be caused at the open end 63 of the diameter-enlarged part 62. Since, however, the clearance CL2 described above is formed (see FIG. 2A), the burr will not interfere with the shaft 33.

As described above, according to the present embodiment, since the open end and its vicinity of the insertion hole 34 are enlarged in diameter, a burr caused in the formation of the insertion hole 34, if any, is less likely to interfere with the shaft 33 when the shaft 33 is inserted. A burr is therefore prevented from being caught or less likely to be caught in the spacing between the shaft 33 and the insertion hole 34.

In particular, in the present embodiment, since the clearance seal is employed, leakage of refrigerant may occur owing to a pressure difference between the first passage 13 and the second passage 14. In this regard, the open end of the insertion hole 34 has an edge shape, which can at least reduce inflow of refrigerant into the insertion hole 34. Thus, even if part of a burr is cracked into pieces, the pieces are prevented from being drawn or caught or are less likely to be drawn or caught into the spacing between the shaft 33 and the insertion hole 34. Furthermore, since the shaft 33 has the stepped portion 64, refrigerant having passed through the valve hole 16 changes its flowing direction along the tapered opposed surface 66. As a result, an injection of refrigerant from the valve hole 16 avoids the portion where a burr may occur. In other words, such a situation in which the injection pushes a burr into the spacing between the shaft 33 and the insertion hole 34 can be avoided or reduced. The operation as described above enables the sliding performance of the shaft 33 to be stably maintained.

Furthermore, in the present embodiment, a wall surface of the downstream-side passage 39 is drilled to form the diameter-enlarged part 62 as illustrated in FIG. 2A, which is also advantageous in that high accuracy of the tapered surface (boundary surface 61) can be achieved relatively easily. Alternatively, it can be attempted to open the support 60 in the wall surface of the downstream-side passage 39 and chamfer (C-chamfer, or the like) the open end thereof into a tapered shape. In this case, however, chamfering at the height of the tapered surface on the basis of the open end will be required, and a design in view of dimensional tolerance of the downstream-side passage 39 and a cutting tool will be required. Thus, particularly when the tapered surface is small as illustrated, the processing thereof will be very difficult. In contrast, in the present embodiment, the wall surface of the downstream-side passage 39 is drilled to form the diameter-enlarged part 62, which can achieve high accuracy of the tapered surface without strict consideration on the dimensional tolerance thereof. In other words, even if the accuracy of processing with a cutting tool is not so high, removal of a burr at the open end of the support 60 can be ensured.

Furthermore, in the present embodiment, since the support 60, the diameter-enlarged part 62, and the valve hole 16 are processed by a stepped blade (drill 72) as illustrated in FIG. 3B, the coaxiality between the valve hole 16 and the support 60 can be increased. This results in an increase in the coaxiality between the valve element 18 connected to the shaft 33 and the valve hole 16, and makes it easier to maintain the refrigerant flow characteristic at a designed value.

The description of the present invention given above is based upon illustrative embodiments. These embodiments are intended to be illustrative only and it will be obvious to those skilled in the art that various modifications could be further developed within the technical idea underlying the present invention.

In the embodiment described above, one example of a method for forming the insertion hole 34 is illustrated in FIGS. 3A and 3B. In a modification, a formation method different therefrom may be employed. For example, the drilling from below illustrated in FIG. 3B may be applied prior to the drilling from above illustrated in FIG. 3A. In addition, the process illustrated in FIG. 3B may be divided into two stages. Specifically, the support 60 may be formed with a first tool, and the diameter-enlarged part 62 may then be formed with a second tool. Although an example in which the diameter-enlarged part 62 and the valve hole 16 are formed simultaneously with a single tool has been presented in the present embodiment, the diameter-enlarged part 62 and the valve hole 16 may be formed in stages with different tools.

Furthermore, formation of the tapered surface 45 on a relatively lower pressure side of the small-diameter part 44 may be omitted for the following reason. When there is a pressure difference between the first passage 13 and the second passage 14, the second passage 14 subjected to a pressure loss at the evaporator is lower in pressure than the first passage 13. The possibility of a burr being drawn from the open end on the lower-pressure side toward the small-diameter part 44 (that is, toward the clearance seal portion) is thus considered to be low.

In the embodiment described above, chamfering is applied to the boundary between the support 60 and the diameter-enlarged part 62 as illustrated in FIG. 2A. In a modification, however, the chamfering may be omitted. In other words, the boundary surface 61 may be formed to be perpendicular to the axis line of the insertion hole 34. When the chamfering is applied, however, as in the embodiment described above, deformation of the open end of the support 60 due to sliding of the shaft 33 can be prevented more easily and the sliding performance of the shaft 33 can be maintained more stably.

In the embodiment described above, an example in which the structures of the shaft 33 and the insertion hole 34 are applied to a thermostatic expansion valve has been presented. In a modification, similar structures may be applied to a motor operated expansion valve having a motor or the like as a drive unit. In this case, the temperature sensing function is unnecessary, and the second passage 14 may thus be omitted in the motor operated expansion valve.

Although the expansion valve of the embodiment described above is suitably applied to a refrigeration cycle using an alternative for chlorofluorocarbon (HFC-134a) or the like as the refrigerant, the expansion valve of the present invention can also be applied to a refrigeration cycle using a refrigerant such as carbon dioxide with high working pressure. In this case, an external heat exchanger such as a gas cooler is provided instead of the condenser in the refrigeration cycle. In this case, disc springs made of metal, for example, may be stacked in order to reinforce the diaphragm included in the power element 3.

In the embodiment described above, an example in which the expansion valve is a valve for throttling and expanding refrigerant having flowed therein via an external heat exchanger and supplying the resulting refrigerant to an evaporator (internal evaporator) has been provided. In a modification, the expansion valve may be applied to a heat pump automotive air conditioner and disposed downstream of an internal heat exchanger. Specifically, the expansion valve may be a valve for throttling and expanding refrigerant having flowed therein via an internal heat exchanger and supplying the resulting refrigerant to an external heat exchanger (external evaporator).

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modification. Also, one or some of all of the components exemplified in the above-described embodiments and modifications may be left unused or removed.

What is claimed is:

1. An expansion valve, which is provided in a refrigeration cycle and which throttles and expands refrigerant, having flowed in via a heat exchanger, by allowing the refrigerant to pass through a valve section so as to supply the refrigerant to an evaporator, the expansion valve comprising:
    a metallic body having a lead-in port through which the refrigerant is led in, a lead-out port through which the refrigerant is led out, a valve hole formed in a refrigerant passage joining the lead-in port to the lead-out port, and a valve chamber formed upstream of the valve hole in the refrigerant passage;
    a valve element, provided in the valve chamber, which opens and closes the valve section by moving toward and away from the valve hole;
    a drive section that generates drive force used to open and close the valve section; and
    a shaft one end side of which connects to the drive section and an other end side of which connects to the valve element through the valve hole, the shaft transmitting the drive force, generated by the drive section in a direction of axis line, to the valve element, wherein the shaft is so provided as to run through an insertion hole formed coaxially with the valve hole in the body,
    the insertion hole, formed in the body by a cutting work, the insertion hole having:
        a support that slidably supports the shaft; and
        a diameter-enlarged part that is open, at an end closer to the valve hole, to a downstream side of the valve hole and whose diameter is larger than that of the support,
    wherein an inner surface of the support has a non-stepped shape in the direction of axis line,
    wherein a clearance between the support and the shaft has such a size that provides a clearance seal minimizing leakage of the refrigerant,
    wherein chamfering is applied to a boundary between the support and the diameter-enlarged part at a depth away from an opening end of the diameter-enlarged part of the insertion hole,
    wherein the diameter-enlarged part has a cylindrical surface having a smaller length in the direction of axis line than the support and a longer length than a length of the chamfering in the direction of axis line, and
    wherein the valve hole has a diameter greater than or equal to that of the diameter-enlarged part of the insertion hole.

2. An expansion valve according to claim 1, wherein the valve chamber is formed coaxially with the valve hole, the refrigerant passage including:
    an upstream-side passage that connects between the lead-in port and the valve chamber, the upstream-side passage extending in a direction perpendicular to the direction of axis of the valve hole; and
    a downstream-side passage that connects between the valve hole and the lead-out port, the downstream-side passage extending in a direction perpendicular to the direction of axis of the valve hole.

3. An expansion valve according to claim 2,
    wherein the diameter-enlarged part is formed such that a cutting blade of a drilling tool is inserted in such a manner as to run through the valve hole from a valve chamber side, and
    wherein the chamfering is carried out simultaneously with the forming of the diameter-enlarged part.

4. An expansion valve according to claim 3, wherein the shaft has a stepped portion having a gradually reduced diameter in the downstream-side passage, and
    wherein the stepped portion has an opposed surface facing the valve hole.

5. An expansion valve according to claim 4, wherein the expansion valve functions as a thermostatic expansion valve that controls an opening degree of the valve section by sensing a pressure and a temperature of the refrigerant returned from the evaporator and that delivers the refrigerant to a compressor,
    wherein the body has a first lead-in port, functioning as the lead-in port, through which the refrigerant is led in from the heat exchanger; a first lead-out port, functioning as the lead-out port, through which the refrigerant is led out to the evaporator; a first passage, functioning as the refrigerant passage, which joins the first lead-in port to the first lead-out port; a second lead-in port through which the refrigerant returned from the evaporator is led in; a second lead-out port through which the refrigerant is led out to the compressor; and a second passage joining the second lead-in port to the second lead-out port,
    wherein a power element, which is activated by sensing a temperature and a pressure of the refrigerant flowing through the second passage, is provided as the drive section on the body on a side opposite to the first passage with respect to the second passage, and
    wherein the shaft is so provided as to run through the insertion hole formed in a partition wall between the first passage and the second passage,
    the one end side of the shaft is connected to the power element across the second passage, and the other end side thereof is connected to the valve element, and the shaft transmits the drive force of the power element to the valve element.

6. An expansion valve according to claim 3, wherein the expansion valve functions as a thermostatic expansion valve that controls an opening degree of the valve section by sensing a pressure and a temperature of the refrigerant returned from the evaporator and that delivers the refrigerant to a compressor,
    wherein the body has a first lead-in port, functioning as the lead-in port, through which the refrigerant is led in from the heat exchanger; a first lead-out port, functioning as the lead-out port, through which the refrigerant is led out to the evaporator; a first passage, functioning as the refrigerant passage, which joins the first lead-in port to the first lead-out port; a second lead-in port through which the refrigerant returned from the evaporator is led in; a second lead-out port through which the refrigerant is led out to the compressor; and a second passage joining the second lead-in port to the second lead-out port, wherein a power element, which is activated by sensing a temperature and a pressure of the refrigerant flowing through the second passage, is provided as the drive section on the body on a side opposite to the first passage with respect to the second passage, and wherein the shaft is so provided as to run through the insertion hole formed in a partition wall between the first passage and the second passage, the one end side of the shaft is connected to the power element across the second passage, and the other end side thereof is connected to the valve element, and the shaft transmits the drive force of the power element to the valve element.

7. An expansion valve according to claim 2, wherein the shaft has a stepped portion having a gradually reduced diameter in the downstream-side passage, and wherein the stepped portion has an opposed surface facing the valve hole.

8. An expansion valve according to claim 7, wherein the expansion valve functions as a thermostatic expansion valve that controls an opening degree of the valve section by sensing a pressure and a temperature of the refrigerant returned from the evaporator and that delivers the refrigerant to a compressor, wherein the body has a first lead-in port, functioning as the lead-in port, through which the refrigerant is led in from the heat exchanger; a first lead-out port, functioning as the lead-out port, through which the refrigerant is led out to the evaporator; a first passage, functioning as the refrigerant passage, which joins the first lead-in port to the first lead-out port; a second lead-in port through which the refrigerant returned from the evaporator is led in; a second lead-out port through which the refrigerant is led out to the compressor; and a second passage joining the second lead-in port to the second lead-out port, wherein a power element, which is activated by sensing a temperature and a pressure of the refrigerant flowing through the second passage, is provided as the drive section on the body on a side opposite to the first passage with respect to the second passage, and wherein the shaft is so provided as to run through the insertion hole formed in a partition wall between the first passage and the second passage, the one end side of the shaft is connected to the power element across the second passage, and the other end side thereof is connected to the valve element, and the shaft transmits the drive force of the power element to the valve element.

9. An expansion valve according to claim 2, wherein the expansion valve functions as a thermostatic expansion valve that controls an opening degree of the valve section by sensing a pressure and a temperature of the refrigerant returned from the evaporator and that delivers the refrigerant to a compressor, wherein the body has a first lead-in port, functioning as the lead-in port, through which the refrigerant is led in from the heat exchanger; a first lead-out port, functioning as the lead-out port, through which the refrigerant is led out to the evaporator; a first passage, functioning as the refrigerant passage, which joins the first lead-in port to the first lead-out port; a second lead-in port through which the refrigerant returned from the evaporator is led in; a second lead-out port through which the refrigerant is led out to the compressor; and a second passage joining the second lead-in port to the second lead-out port, wherein a power element, which is activated by sensing a temperature and a pressure of the refrigerant flowing through the second passage, is provided as the drive section on the body on a side opposite to the first passage with respect to the second passage, and wherein the shaft is so provided as to run through the insertion hole formed in a partition wall between the first passage and the second passage, the one end side of the shaft is connected to the power element across the second passage, and the other end side thereof is connected to the valve element, and the shaft transmits the drive force of the power element to the valve element.

10. An expansion valve according to claim 1, wherein the expansion valve functions as a thermostatic expansion valve that controls an opening degree of the valve section by sensing a pressure and a temperature of the refrigerant returned from the evaporator and that delivers the refrigerant to a compressor, wherein the body has a first lead-in port, functioning as the lead-in port, through which the refrigerant is led in from the heat exchanger; a first lead-out port, functioning as the lead-out port, through which the refrigerant is led out to the evaporator; a first passage, functioning as the refrigerant passage, which joins the first lead-in port to the first lead-out port; a second lead-in port through which the refrigerant returned from the evaporator is led in; a second lead-out port through which the refrigerant is led out to the compressor; and a second passage joining the second lead-in port to the second lead-out port, wherein a power element, which is activated by sensing a temperature and a pressure of the refrigerant flowing through the second passage, is provided as the drive section on the body on a side opposite to the first passage with respect to the second passage, and wherein the shaft is so provided as to run through the insertion hole formed in a partition wall between the first passage and the second passage, the one end side of the shaft is connected to the power element across the second passage, and the other end side thereof is connected to the valve element, and the shaft transmits the drive force of the power element to the valve element.

* * * * *